US 012275081B2

(12) United States Patent
Wolf (10) Patent No.: US 12,275,081 B2
(45) Date of Patent: Apr. 15, 2025

(54) THREAD-CUTTING DIE HEAD FOR POWERED PIPE THREADER

(71) Applicant: MILWAUKEE ELECTRIC TOOL CORPORATION, Brookfield, WI (US)

(72) Inventor: Matthew R. Wolf, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/444,296

(22) Filed: Feb. 16, 2024

(65) Prior Publication Data

US 2024/0189931 A1 Jun. 13, 2024

Related U.S. Application Data

(62) Division of application No. 17/537,723, filed on Nov. 30, 2021, now Pat. No. 11,931,816.

(Continued)

(51) Int. Cl.
*B23G 5/12* (2006.01)
*B23G 1/24* (2006.01)
*B23G 5/08* (2006.01)

(52) U.S. Cl.
CPC ............... *B23G 5/12* (2013.01); *B23G 1/24* (2013.01); *B23G 5/083* (2013.01)

(58) Field of Classification Search
CPC ............. B23G 1/24; B23G 5/083; B23G 5/12
See application file for complete search history.

(56) References Cited

U.S. PATENT DOCUMENTS

| 1,044,808 A | 11/1912 | Oster |
| 1,991,636 A | 2/1935 | Sternbergh |

(Continued)

FOREIGN PATENT DOCUMENTS

| CN | 101704141 A | 5/2010 |
| CN | 206084041 U | 4/2017 |

(Continued)

OTHER PUBLICATIONS

International Search Report and Written Opinion for Application No. PCT/US2021/061077 dated Mar. 14, 2022 (11 pages).

(Continued)

*Primary Examiner* — Eric A. Gates
(74) *Attorney, Agent, or Firm* — Michael Best & Friedrich LLP (57) ABSTRACT

A thread-cutting die head includes a die carrier supporting thread-cutting dies for displacement in a radial direction, a cam plate coaxial with the die carrier including a plurality of cam members for engaging the thread-cutting dies and displacing the cutting dies in a radial direction in response to relative rotation between the cam plate and the die carrier, and a locking system. The locking system includes a positioning screw extending through an arcuate slot in the cam plate, a cam washer surrounding the positioning screw, and a pin threaded to the positioning screw. The locking system further includes a cam handle including a cylindrical cam portion engaged with the cam washer. Rotation of the cam handle in a first direction is configured to impart a clamping force against the cam washer to lock the rotational position of the cam plate relative to the die carrier.

7 Claims, 12 Drawing Sheets

Related U.S. Application Data (60) Provisional application No. 63/241,134, filed on Sep. 7, 2021, provisional application No. 63/119,973, filed on Dec. 1, 2020.

(56) References Cited

U.S. PATENT DOCUMENTS

| | | |
|---|---|---|
| 2,710,979 A | 6/1955 | Strickland |
| 2,938,221 A | 5/1960 | Bjalme |
| 2,938,222 A | 5/1960 | Bjalme |
| 3,562,827 A | 2/1971 | Janik |
| 4,370,770 A | 2/1983 | Wagner |
| 11,931,816 B2 * | 3/2024 | Wolf ........................ B23G 1/24 |
| 2019/0006980 A1 | 1/2019 | Sheeks et al. |
| 2019/0044110 A1 | 2/2019 | Sheeks et al. |

FOREIGN PATENT DOCUMENTS

| | | |
|---|---|---|
| EP | 0249184 B1 | 2/1993 |
| EP | 0569320 A1 | 11/1993 |
| FR | 1047707 A | 12/1953 |
| FR | 2364728 A1 | 4/1978 |
| JP | 4392824 B2 | 1/2010 |
| KR | 860000920 Y1 | 5/1986 |

OTHER PUBLICATIONS

European Patent Office Action for Application No. 21901297.8 dated Nov. 21, 2024 (10 pages).

\* cited by examiner

THREAD-CUTTING DIE HEAD FOR POWERED PIPE THREADER

CROSS-REFERENCE TO RELATED APPLICATIONS

This application is a divisional of U.S. patent application Ser. No. 17/537,723 filed on Nov. 30, 2021, now U.S. Pat. No. 11,931,816, which claims priority to U.S. Provisional Patent Application No. 63/241,134 filed on Sep. 7, 2021 and U.S. Provisional Patent Application No. 63/119,973 filed on Dec. 1, 2020, the entire contents of all of which are incorporated herein by reference.

FIELD OF THE INVENTION

The present invention relates to powered pipe thread-cutting machines, and more particularly to thread-cutting die heads to be used with powered pipe thread-cutting machines.

BACKGROUND OF THE INVENTION

Powered pipe threading machines typically include a stand and a carriage mounted to the stand having a plurality of pipe threading tools. These tools are usually a thread-cutting die head, a cutter, and a reamer. Typically, a motor transmits torque to a spindle to which a pipe is clamped for rotating the pipe with respect to the tools. The motor is an AC motor that receives power from a power source (e.g., via a power cord) and is usually controlled using a pedal, which upon actuation, triggers the motor to begin threading the pipe. Generally, the cutting die head is pivotally supported on the tool carriage for displacement between stored and use positions. In the use position, the die head is adjusted to fit a desired pipe diameter by radially adjusting a plurality of cutting dies to surround an outer diameter of the pipe by rotating a cam plate with a locking latch supported on the die head. Once the die head is properly adjusted, the plurality of cutting dies are locked into place by a lock lever supported on the locking latch that is tightened by hand. The lock lever typically applies a clamping force to the cam plate by tightening an adjustment screw against the surface of the cam plate to lock it into position.

SUMMARY OF THE INVENTION

The present invention provides, in one aspect, a thread-cutting die head for a powered pipe threading machine. The thread-cutting die head includes a die carrier, defining a central axis, for supporting a plurality of thread-cutting dies for displacement relative to the central axis in a radially inward direction and radially outward direction, a cam plate coaxial with the die carrier including a plurality of cam members for engaging with the plurality of thread-cutting dies and displacing the cutting dies in the radially inward direction and radially outward direction in response to relative rotation between the cam plate and the die carrier, and a locking system. The locking system includes a positioning screw extending through an arcuate slot in the cam plate, a cam washer surrounding the positioning screw, and a pin threaded to the positioning screw. The locking system further includes a cam handle including a cylindrical cam portion engaged with the cam washer and defining a rotational axis of the handle, and an aperture in which the pin is slidably received, the aperture defining a longitudinal axis that is offset from the rotational axis of the handle. Rotation of the cam handle in a first direction about the rotational axis is configured to impart a clamping force against the cam washer to lock the rotational position of the cam plate relative to the die carrier.

The present invention provides in another aspect, a thread-cutting die head for a powered pipe threading machine. The thread-cutting die head includes a die carrier, defining a central axis, for supporting a plurality of thread-cutting dies for displacement relative to the central axis in a radially inward direction and radially outward direction a cam plate coaxial with the die carrier including a plurality of cam members for engaging with the plurality of thread-cutting dies and displacing the cutting dies in the radially inward direction and radially outward direction in response to relative rotation between the cam plate and the die carrier. The thread-cutting die head also includes a locking system having a bushing, a die-locking arm pivotably supported upon the bushing, a positioning screw extending through an arcuate slot in the cam plate and the die-locking arm, wherein the bushing surrounds and is threaded to the positioning screw, and a coupler coupled for co-rotation with the bushing and being engaged with the die-locking arm when the coupler is located in a first position relative to the positioning screw. The locking system further includes a spring for biasing the coupler away from the first position and toward a second position in which the coupler is disengaged from the die-locking arm, wherein, with the coupler in the first position, rotation of the die-locking arm in a first direction is configured to rotate the bushing relative to the positioning screw in a tightening direction, thereby imparting a clamping force between the bushing and the cam plate to develop a frictional force for locking the rotational position of the cam plate relative to the die carrier.

Other features and aspects of the invention will become apparent by consideration of the following detailed description and accompanying drawings.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
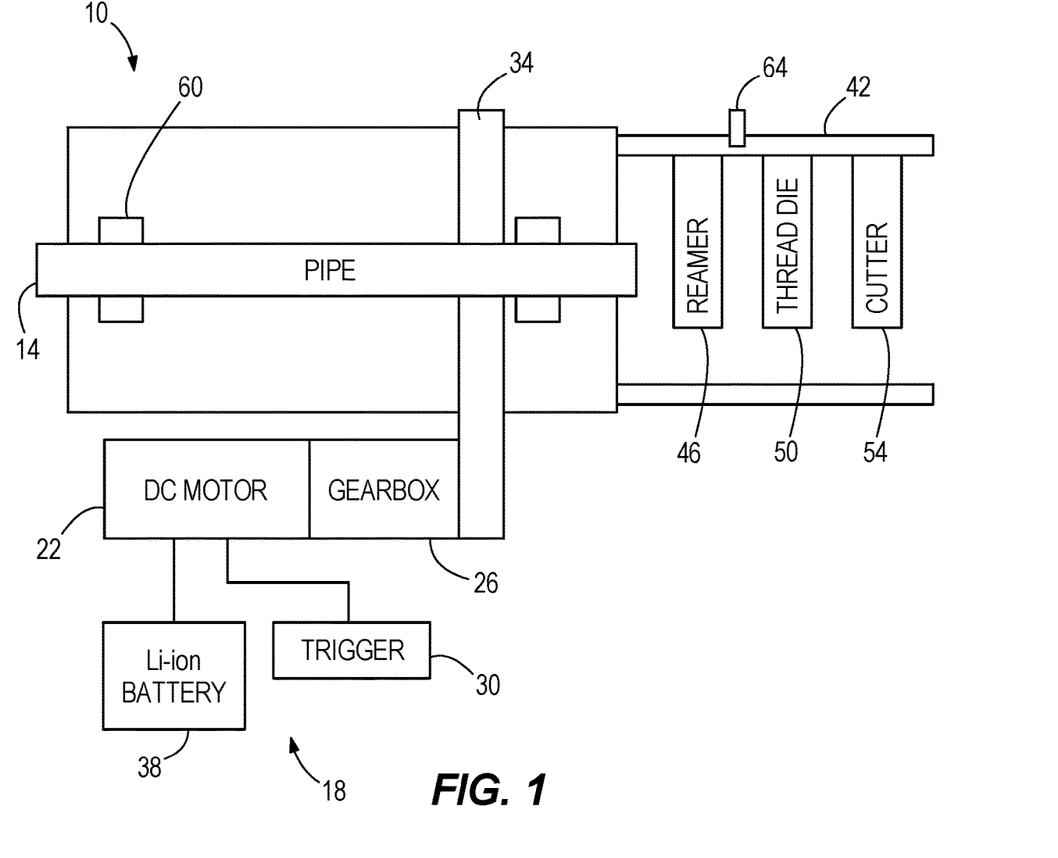
FIG. 1 is a top view of a powered pipe threader.

With reference to FIG. 1, a portable pipe threader 10 includes a stand (not shown) and a carriage 42 supported by the stand having a plurality of pipe threading tools 46, 50, 54 pivotably supported by the carriage 42. The pipe threader 10 further includes a drive assembly 18 mounted to the stand having a motor 22 (e.g., a direct current brushless motor), a gear box 36 coupled to the motor 22 having an output gear (not shown), and a pedal 30 that selectively controls the drive assembly 18. The drive assembly 18 is powered by a battery pack 38 supported by the stand in selective electrical communication with the motor 22 to provide electrical power to the motor 22. In some constructions, the battery pack 38 and the motor 22 can be configured as an 18 Volt high power battery pack and motor, such as the 18 Volt high power system disclosed in U.S. patent application Ser. No. 16/045,513 filed on Jul. 25, 2018 (now U.S. Patent Application Publication No. 2019/0044110), the entirety of which is incorporated herein by reference. In other constructions, the battery pack 38 and the motor 22 can be configured as an 80 Volt high power battery and motor, such as the 80 Volt battery pack and motor disclosed in U.S. patent application Ser. No. 16/025,491 filed on Jul. 2, 2018 (now U.S. Patent Application Publication No. 2019/0006980), the entirety of which is incorporated herein by reference.

With reference to FIG. 1, the drive assembly 18 further includes a drive element 34 (e.g., a belt) coupled to the gear box 26 and powered by the motor 22. The motor 22 is configured to supply torque to the output gear of the gear box 26, rotatably driving the drive element 34 to rotate a pipe 14 or a selected one of the plurality of pipe threading tools. The pedal 30 is operable to activate the motor 22 and control a relative speed at which the pipe 14 rotates.

The portable pipe threader 10 further includes a spindle 60 in which the pipe 14 is clamped. The drive element 34 interconnects the spindle 60 and the output gear of the gear box 26. Thus, torque from the motor 22 is transferred to the spindle 60, causing it and the pipe 14 to rotate, via the gear box 26 and the drive element 34. The plurality of pipe threading tools 46, 50, 54 includes a die holder 46 (FIG. 2) having a plurality of thread-cutting dies 112 to cut threads on the pipe 14, a cutter 50 to trim excess pipe 14, and a reamer 54 to deburr or smooth edges of the threaded or cut pipe 14. The pipe threading tools 46, 50, 54 remain stationary on the carriage 42 while the pipe 14 is rotated by the spindle 60.

Figure 2:
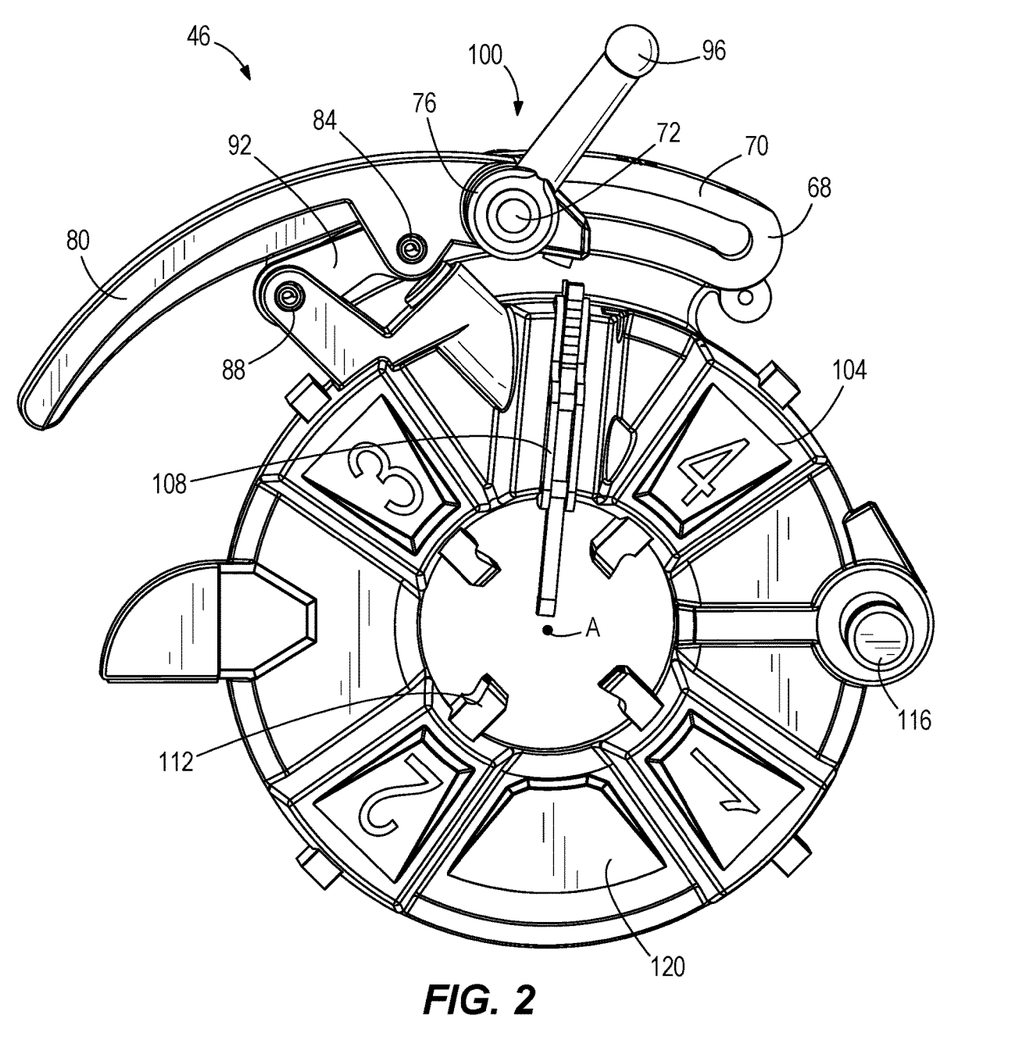
FIG. 2 is a front view of a thread-cutting die head in accordance with an embodiment of the invention for use with the powered pipe threader of FIG. 1.
Figure 3:
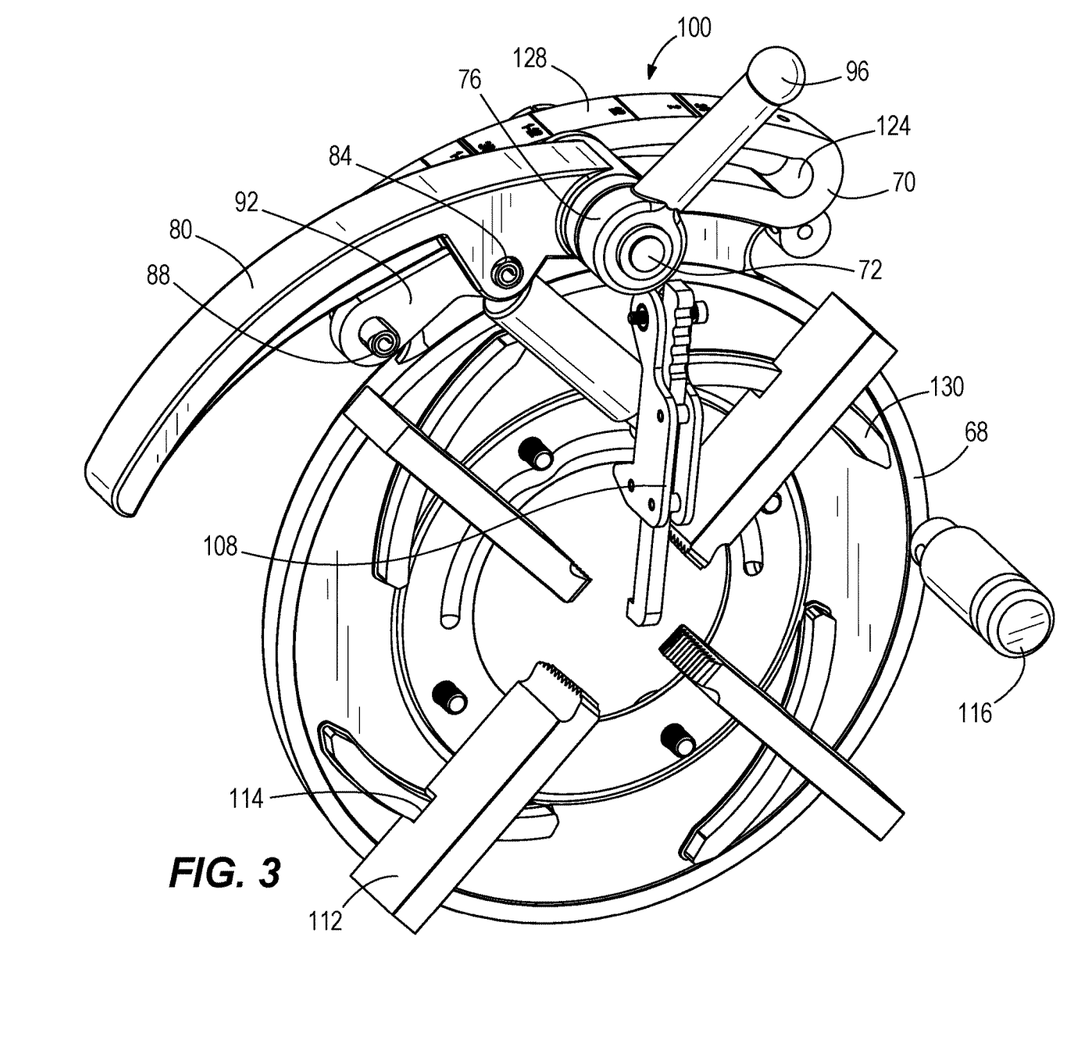
FIG. 3 is a partial cutaway, perspective view of the die head of FIG. 2.

FIGS. 2 and 3 illustrate a pipe threading tool, such as a thread-cutting die head 46, according to an embodiment of the invention. With reference to FIG. 2, the thread-cutting die head 46 includes a die carrier 120 defining a central axis A and having a plurality of die holding portions 104 radially disposed about the die carrier 120 for holding respective thread-cutting dies 112, a support rod 116 protruding from the die carrier 120 for pivotably mounting the die head 46 on the carriage 42, and a cam plate 68 rotatable relative to the die carrier 120 rotatably supporting the plurality of thread-cutting dies 112. With reference to FIG. 3, the cam plate 68 includes a plurality of cam members, such as scroll projections 130, radially disposed about the cam plate 68 for engaging a respective slot 114 in each of the cutting dies 112. The rotation of the cam plate 68 relative to the die carrier 120 in opposite directions imparts radial displacement to the cutting dies 112 in a radially inward direction and a radially outward direction relative to the die head 46. The cam plate 68 further includes an arcuate slot 124 at the top thereof and a depth scale 128 for measuring a radial depth of the thread-cutting dies 112 with respect to the pipe 14, thereby permitting a user to adjust the die head 46 for use with pipes having different nominal outer diameters.

In some embodiments, the die head 46 can include an automatic trip lever 108 for automatically opening the thread-cutting dies 112 (i.e., by imparting displacement to the dies 112 in a radially outward direction) upon completion of a threading operation to facilitate removal of the die head 46 from the pipe 14. In other embodiments, the arcuate slot 124 can be supported on the die carrier 120 instead of the cam plate 68.

With continued reference to FIGS. 2 and 3, the die head 46 further includes a die-locking arm 80 pivotably mounted to the top of the die carrier 120 via a pins 88, 84 and 92. And, the die-locking arm 80 is pivotably mounted to the cam plate 68 via a locking system 100, which is operable to lock a rotational position of the cam plate 68 relative to the die carrier 120, and thus lock the radial position of the dies 112. The die-locking arm 80 can be configured to be actuated between a latched position (FIG. 2), in which the dies 112 are held in a radially inward position for engaging the outer surface of the pipe 14, and an unlatched or released position. In the unlatched or released position of the die-locking arm 80, the cutting dies 112 are at least partially retracted into their respective holding portions 104 and disengaged from the outer surface of the pipe 14 to facilitate removal of the die head 46 from the pipe 14.

Also, with the die-locking arm 80 in the released position, the locking system 100 can be released to rotate the cam plate 68 relative to the die carrier 120 for radially displacing the dies 112 radially inward and outward relative to the die head 46 to adjust the die head 46 for cutting threads in pipes having different nominal outer diameters. Once the user has adjusted the thread-cutting dies 112 to a desired depth according to the depth scale 128 on the cam plate 68, the locking system 100 is tightened or re-locked to secure the position of the cam plate 68 relative to the locking system 100. Thus, when the die-locking arm 80 is again pivoted to the latched position, the cutting dies 112 extend radially inward according to the user-selected depth on the depth scale 128 coinciding with a nominal outer diameter of the pipe 14 in which threads will be cut.

Figure 4:
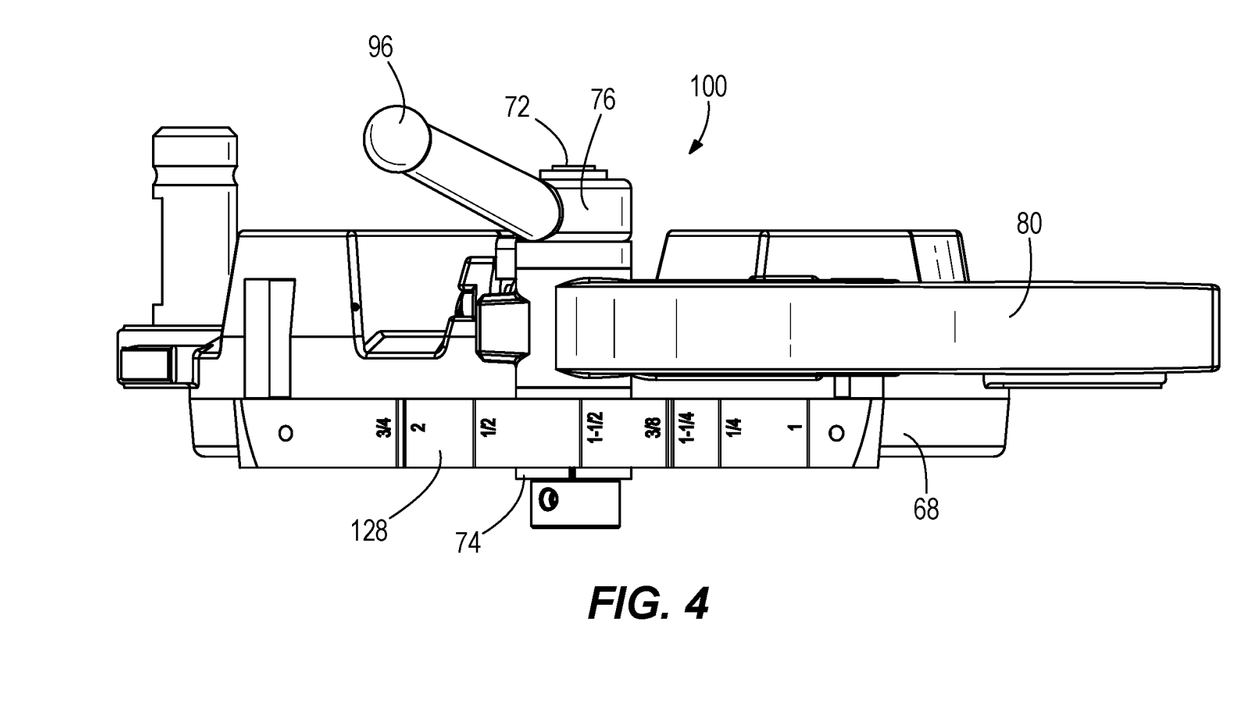
FIG. 4 is a top view of the die head of FIG. 2.
Figure 5:
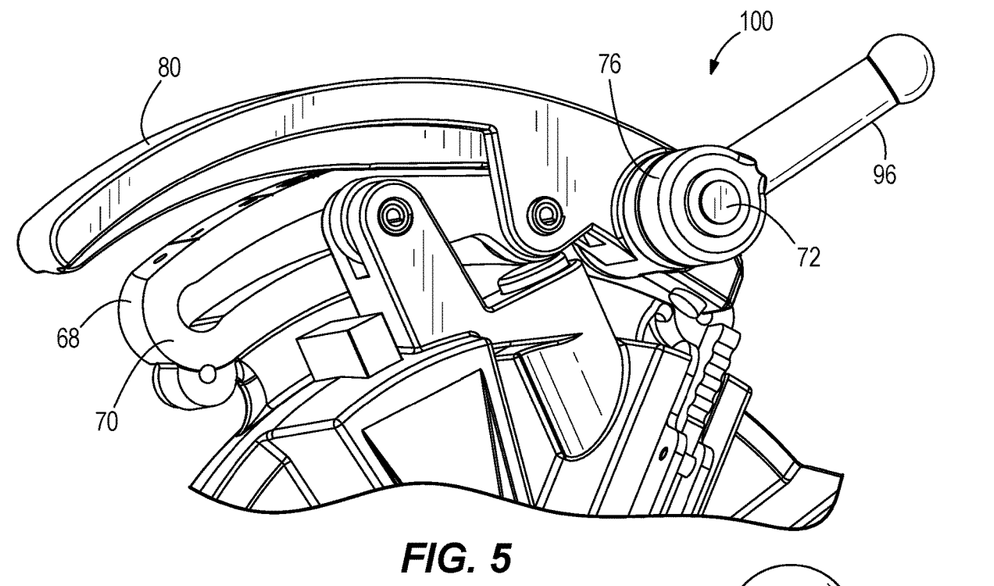
FIG. 5 is an enlarged, perspective view of the die head of FIG. 2 illustrating a die locking system.
Figure 6:
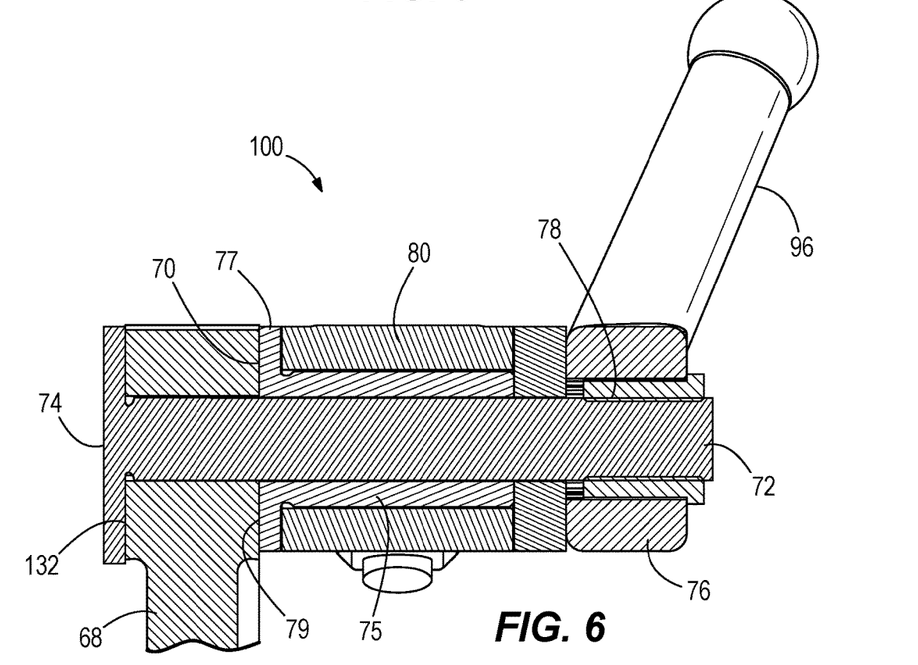
FIG. 6 is a side, cross-sectional view of the die locking system of FIG. 5.

With reference to FIGS. 4-6, the locking system 100 includes a positioning screw 72 extending through the die-locking arm 80 and into the arcuate slot 124 of the cam plate 68. The positioning screw 72 includes a head 74 contacting a rear face 132 of the cam plate 68 (FIG. 6). The locking system 100 also includes a bushing 75 surrounding the positioning screw 72 having a cylindrical portion about which the die-locking arm 80 is pivotably mounted and a flange portion 77 positioned between the cam plate 68 and the die-locking arm 80. The flange portion 77 includes an annular surface 79 facing a front face 70 of the cam plate 68. With continued reference to FIG. 6, the locking system 100 further includes a nut 76 fastened to a threaded portion 78 of the positioning screw 72, a washer positioned between the nut 76 and the cylindrical portion of the bushing 75, and a handle 96 coupled for co-rotation with the nut 76.

When the handle 96 is rotated in a tightening direction relative to the positioning screw 72, the nut 76, washer, and the bushing 75 are displaced toward the cam plate 68, thereby imparting a clamping force between the flange portion 77 of the bushing 75, the cam plate 68, and the head 74 of the positioning screw 72. However, a nominal clearance is maintained between the die-locking arm 80, the flange portion 77, and the washer; permitting the die-locking arm 80 to pivot between the latched and released positions described above when the locking system 100 is tightened.

In the embodiment of the locking system 100 shown in FIGS. 2-6, the front face 70 of the cam plate 68 includes a relatively high surface roughness, such as knurling, and the bushing 75 is made from a material having a lower hardness than that of the cam plate 68. As such, when the clamping force is applied to the cam plate 68 as described above, the knurling on the front face 70 of the cam plate 68 can protrude or deform into the flange portion 77 of the bushing 75, thereby increasing friction between the cam plate 68 and the bushing 75. This effectively interlocks the cam plate 68 to the bushing 75, and thus the cam plate 68 to the die carrier 120 (via the arm 80, pins 88, 84, and link 92). This increased frictional interference between the bushing 75 and the cam plate 68 allows the user to apply the clamping force against the cam plate 68 by rotating the handle 96 without using a cheater bar or other tool to increase the user's leverage on the handle 96. Therefore, unintentional loosening of the locking system 100 when the die head 46 is forming threads on the pipe 14 is prevented.

In some embodiments of the locking system 100, the knurling on the front face 70 of the cam plate 68 can be omitted and the surface roughness of the front face 70 can be made higher than that of the bushing 75 in other manners; therefore, increasing the coefficient of friction between the cam plate 68 and the bushing 75.

Figure 7A:
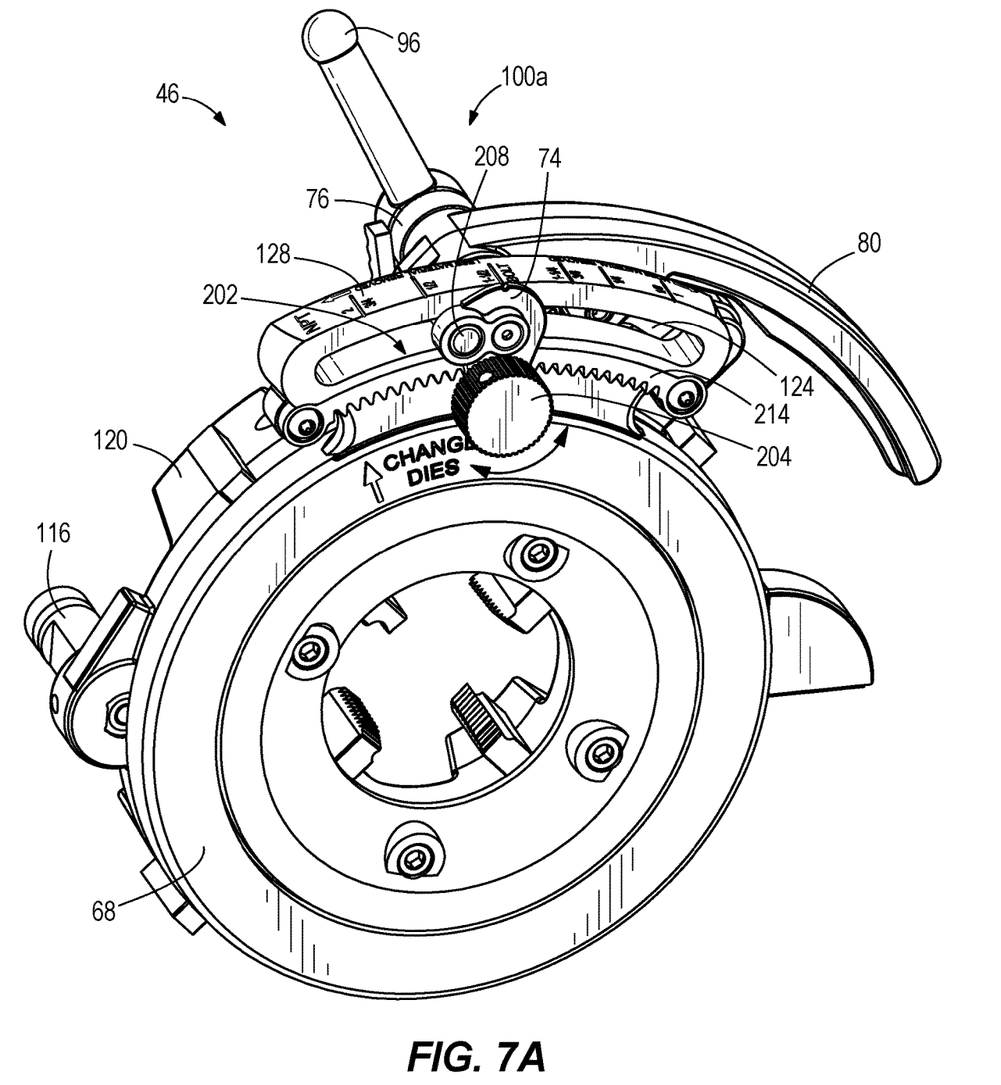
FIG. 7A is a perspective view of the die head of FIG. 2, but including a die locking system in accordance with another embodiment of the invention.
Figure 7B:
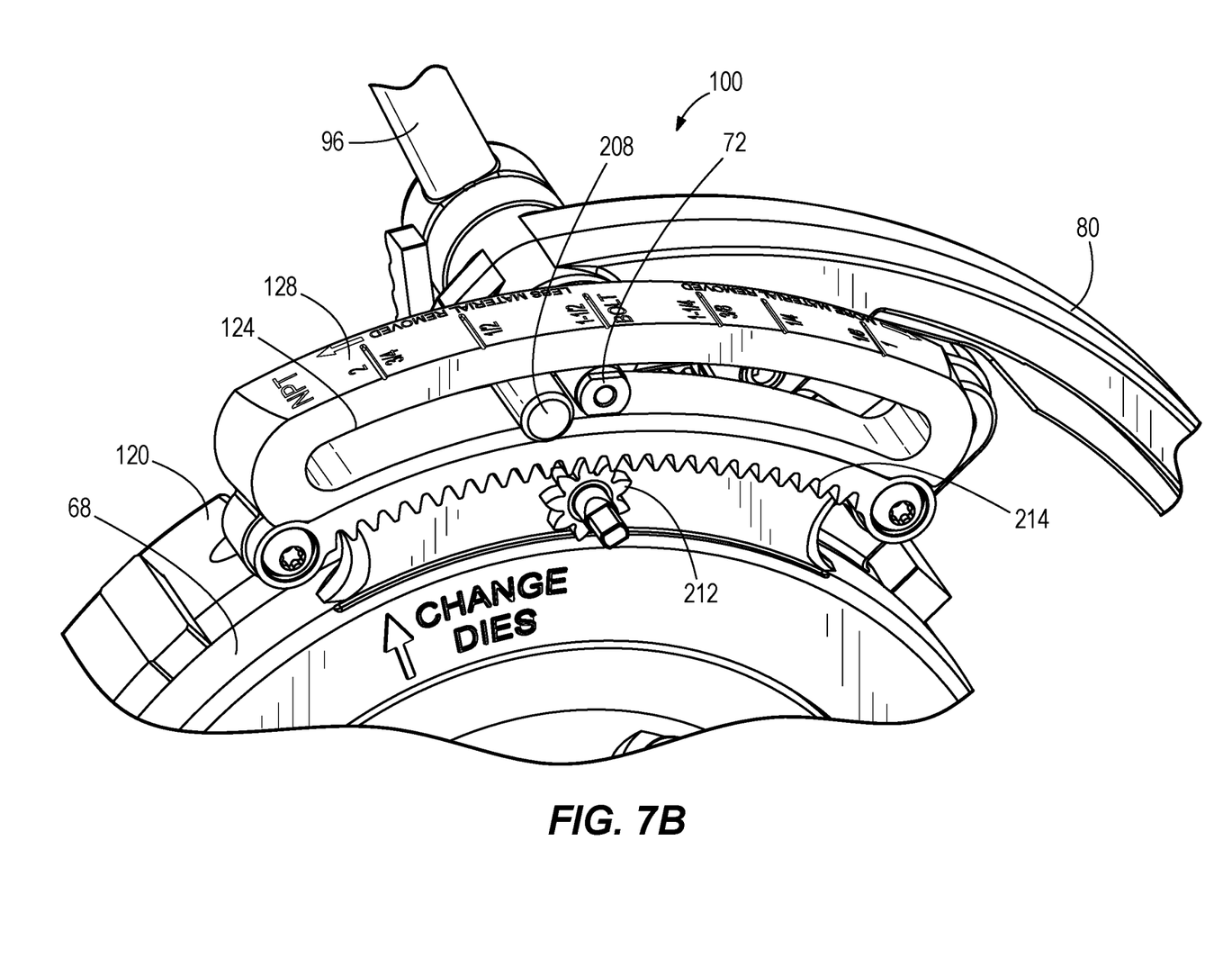
FIG. 7B is a perspective view of the die locking system of FIG. 7A, with portions removed.

FIGS. 7A and 7B illustrate the thread-cutting die head 46 of FIG. 2, but including an alternative embodiment of a die locking system 100a. The components of the die locking system 100a that are common with the die locking system 100 are identified with like reference numerals, and only the differences between the systems 100, 100a are described below. The locking system 100a additionally includes a fine adjustment mechanism 202 to perform small adjustments to the nominal pipe size prior to rotating the handle 96 in a tightening direction (as described above) to impart a clamping force between the flange portion 77 of the bushing 75, the cam plate 68, and the head 74 of the positioning screw 72 (FIG. 6).

With reference to FIGS. 7A and 7B, the fine adjustment mechanism 202 includes an actuator (e.g., an adjusting knob 204) rotatably supported upon the head 74 of the positioning screw 72, a pinion 212 coupled for co-rotation with the knob 204, and an arcuate rack 214 attached to the cam plate 68 with which the pinion 212 is meshed. After the user rotates the die carrier 120 relative to the cam plate 68 to an approximate position coinciding with a desired nominal diameter of pipe to be threaded, and prior to rotating the handle 96 in the tightening direction, the user can rotate the adjusting knob 204, and therefore the pinion 212, in either a clockwise or counterclockwise direction, causing the pinion 212 to walk along the rack 214. Because the pinion 212 is rotatably supported by the head 74 of the positioning screw 72, the positioning screw 72 and the die carrier 120 move in unison relative to the cam plate 68 and in an opposite rotational direction as the knob 204 and pinion 212 to make a fine adjustment to the rotational orientation of the die carrier 120 relative to the cam plate 68, and therefore the radial position of the cutting dies 112. The die locking system 100a also includes a guide pin 208 parallel to the positioning screw 72 and positioned within the arcuate slot 124. The guide pin 208 has a nominal sliding clearance with the slot 124 and prevents rotation of the positioning screw 72 within the slot 124 in response to rotation of the knob 204 and pinion 212.

Figure 8A:
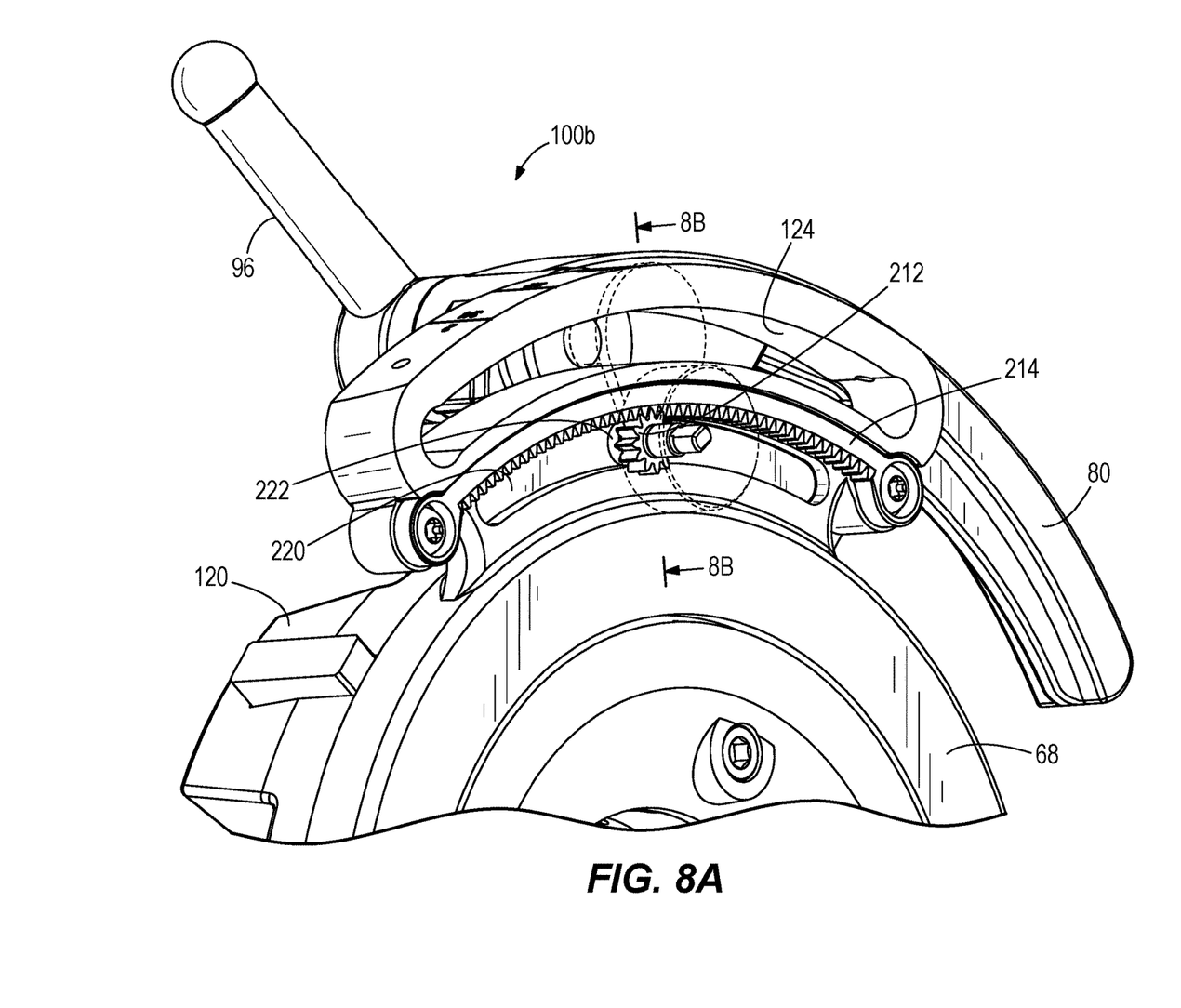
FIGS. 8A and 8B are perspective views of alternative configurations of the die locking system of FIG. 7A.

FIG. 8A illustrates another embodiment of a die locking system 100b, with like features as the die locking systems 100, 100a being identified with like reference numerals. In this embodiment, the cam plate 68 includes an additional arcuate slot 220 beneath the rack 214 in which a bushing 222 that rotatably supports the pinion 212 is slidable. As such, the shaft on which the pinion 212 is formed is supported at one end by the bushing 222 and at an opposite end by the head 74 of the positioning screw 72. In contrast, the shaft on which the pinion 212 is formed in the die locking system 100a is cantilevered from the head 74 of the positioning screw 72.

Figure 8B:
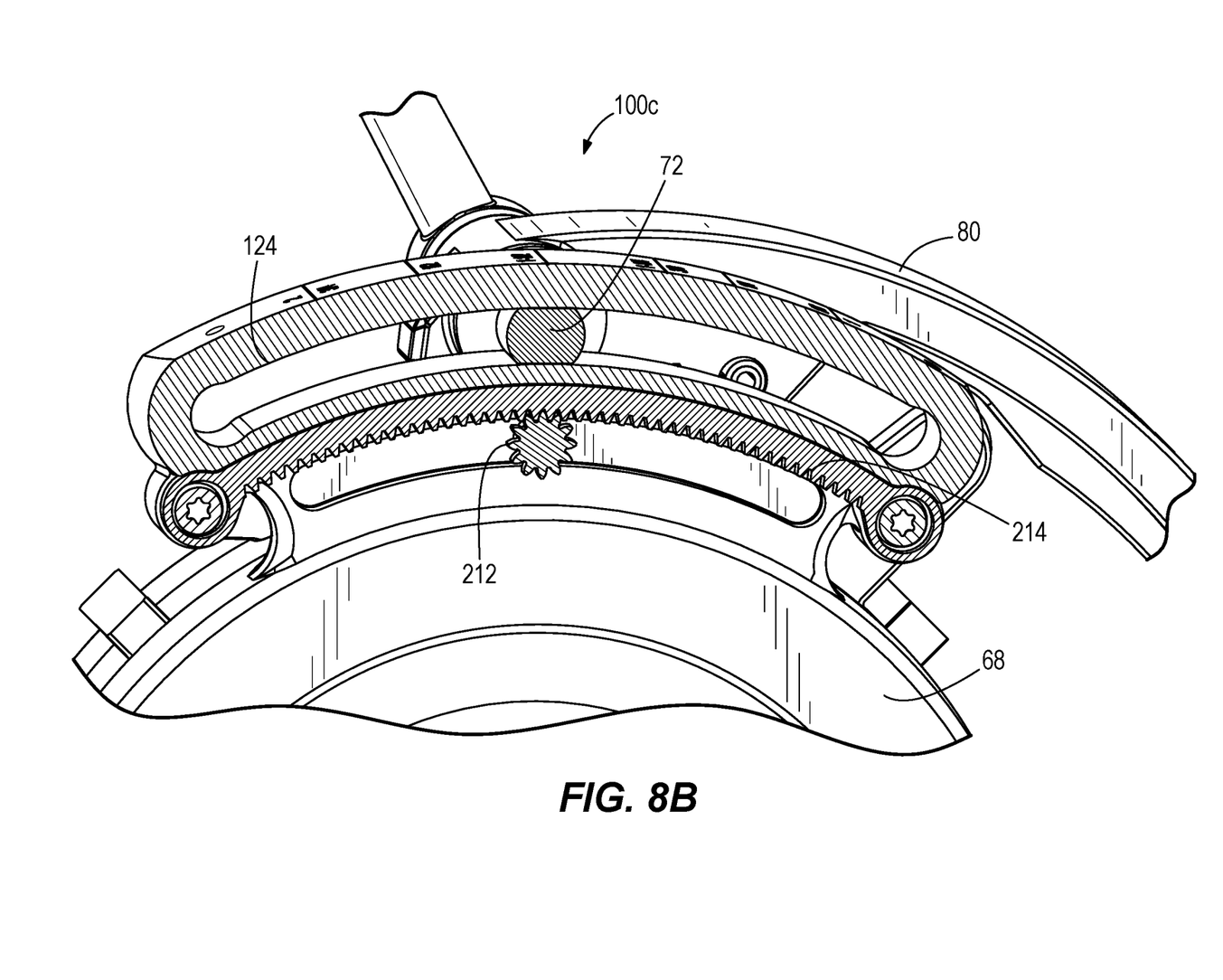

FIG. 8B illustrates yet another embodiment of a die locking system 100c, with like features as the die locking systems 100, 100a being identified with like reference numerals. In this embodiment, the positioning screw 72 includes a double-D cross-sectional shape with opposed flats being in slidable contact with the opposed sidewalls of the slot 124. The flats have a nominal sliding clearance with the slot 124 and prevent rotation of the positioning screw 72 within the slot 124 in response to rotation of the pinion 212. Alternatively, the cross-sectional shape of the positioning screw may be another polygon, or two arcs that fit into the slot 124, that prevent rotation of the positioning screw 72 within the slot 124.

Figure 9:
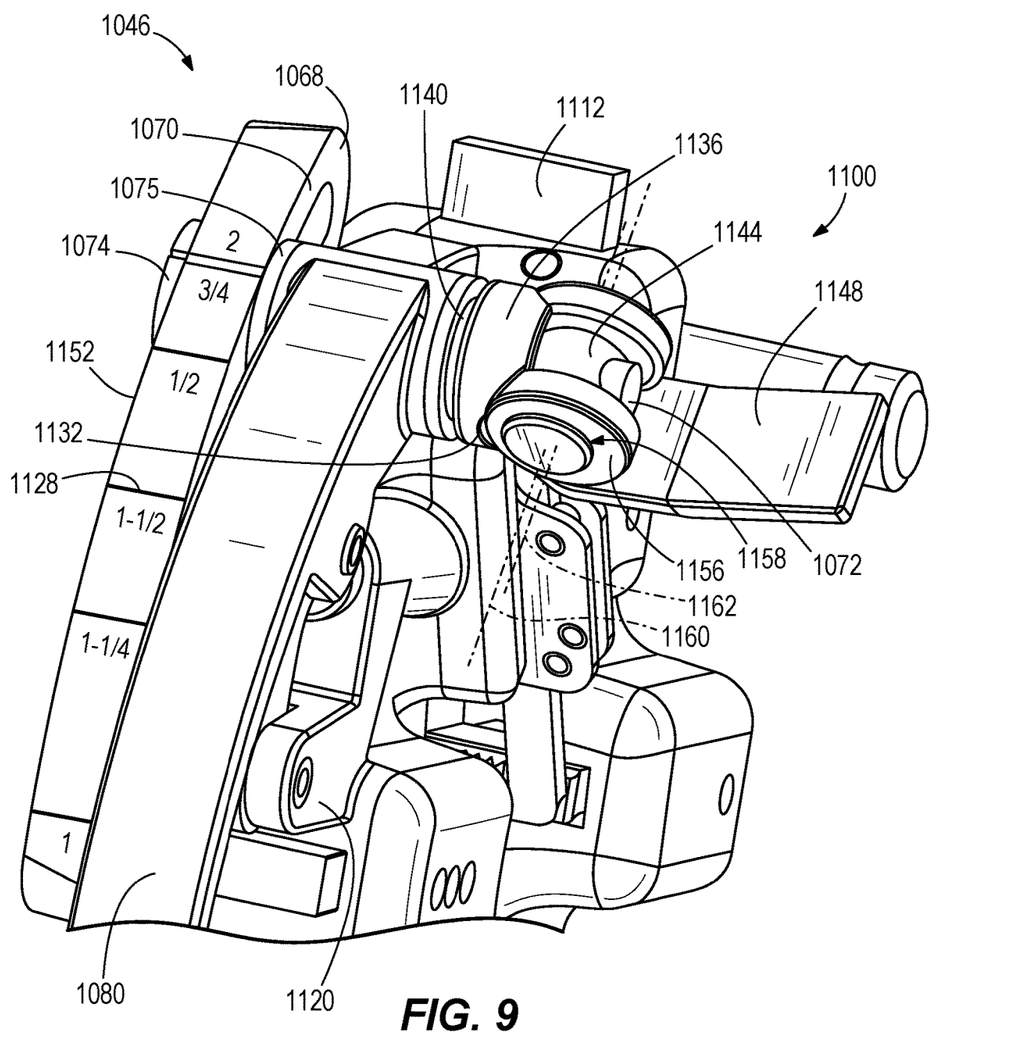
FIG. 9 is a side, perspective view of a thread-cutting die head in accordance with another embodiment of the invention for use with the powered pipe threader of FIG. 1.

FIG. 9 illustrates another embodiment of a die head 1046 including a locking system 1100. Like components and features of the die head 46 of FIGS. 2-8B will be used plus "1000". The locking system 1100 is configured as an over-center cam locking system including a positioning screw 1072 extending through the die-locking arm 1080 and into the arcuate slot 1124 of the cam plate 1068. The positioning screw 1072 includes a head 1074 contacting a rear face 1152 of the cam plate 1068 (FIG. 6).

The locking system 1100 further includes a cam washer 1136 surrounding the positioning screw 1072 and abutting the die-locking arm 1080 having a plurality of cam surfaces 1132, a bushing 1075 surrounding the positioning screw 1072 and partially received within the die-locking arm 1080, a cam pin 1144 threaded to the positioning screw 1072, and a cam handle 1148 pivotably coupled to the cam pin 1144. The cam pin 1144 is eccentrically mounted within a cylindrical cam portion 1156 of the cam handle 1148, which is slidably engaged with the cam surfaces 1132 on the cam washer 1136. The cylindrical cam portion 1156 defines a rotational axis 1162 of the cam handle 1148 and includes an aperture 1158 for slidably receiving the cam pin 1144 for defining a longitudinal axis 1160 that is offset from the rotational axis 1162 of the cam handle 1148.

As such, in response to pivoting movement of the cam handle 1148 relative to the cam pin 1144 about the rotational axis of the cam handle 1148, an axial displacement is applied to the cam pin 1144, and thus the positioning screw 1072. To secure the locking system 1100 to the cam plate 1068, the user only needs to pivot the cam handle 1148 from a released position, in which a clamping force on the cam plate 1068 is released to thereby permit a positional adjustment of the locking system 1100 relative to the depth scale 1128 (shown in FIG. 9), to a locking position, in which a clamping force is applied to the cam plate 1068 to secure the locking system 1100 relative to the depth scale 1128 and the cam plate 1068. Specifically, when pivoting the cam handle 1148 from the released position to the locking position, the cam pin 1144 is displaced in a direction away from the cam plate 1068, which pushes the cam washer 1136 against the die-locking arm 1080, and pushes the bushing 1075 against the front face 1070 of the cam plate 1068. At the same time, the head 1074 of the positioning screw 1072 is pulled against the rear face 1152 of the cam plate 1068, applying the clamping force to the cam plate 1068.

In some embodiments of the locking system 1100, the system 1100 can include a rubber isolator 1140 surrounding the positioning screw 1072 and positioned between the di-locking arm 1080 and the cam washer 1136 for actively dampening the vibration transmitted from the die head 1046 to locking system 1100 during use. By dampening this vibration, the locking system 1100 can maintain its clamping load on the cam plate 1068 to prevent unintentional loosening of the locking system 1100 during operation of the die head 1046. In other embodiments of the locking system 1100, the rubber isolator 1140 can make it easier for the user to actuate the cam handle 1148. In yet other embodiments, the front and/or rear faces 1070, 1152 of the cam plate 1068 may include knurling or an increased surface roughness, like the cam plate 1068 in the die head 1046, to further increase the frictional force developed between the cam plate 1068 and the locking system 1100.

Figure 10:
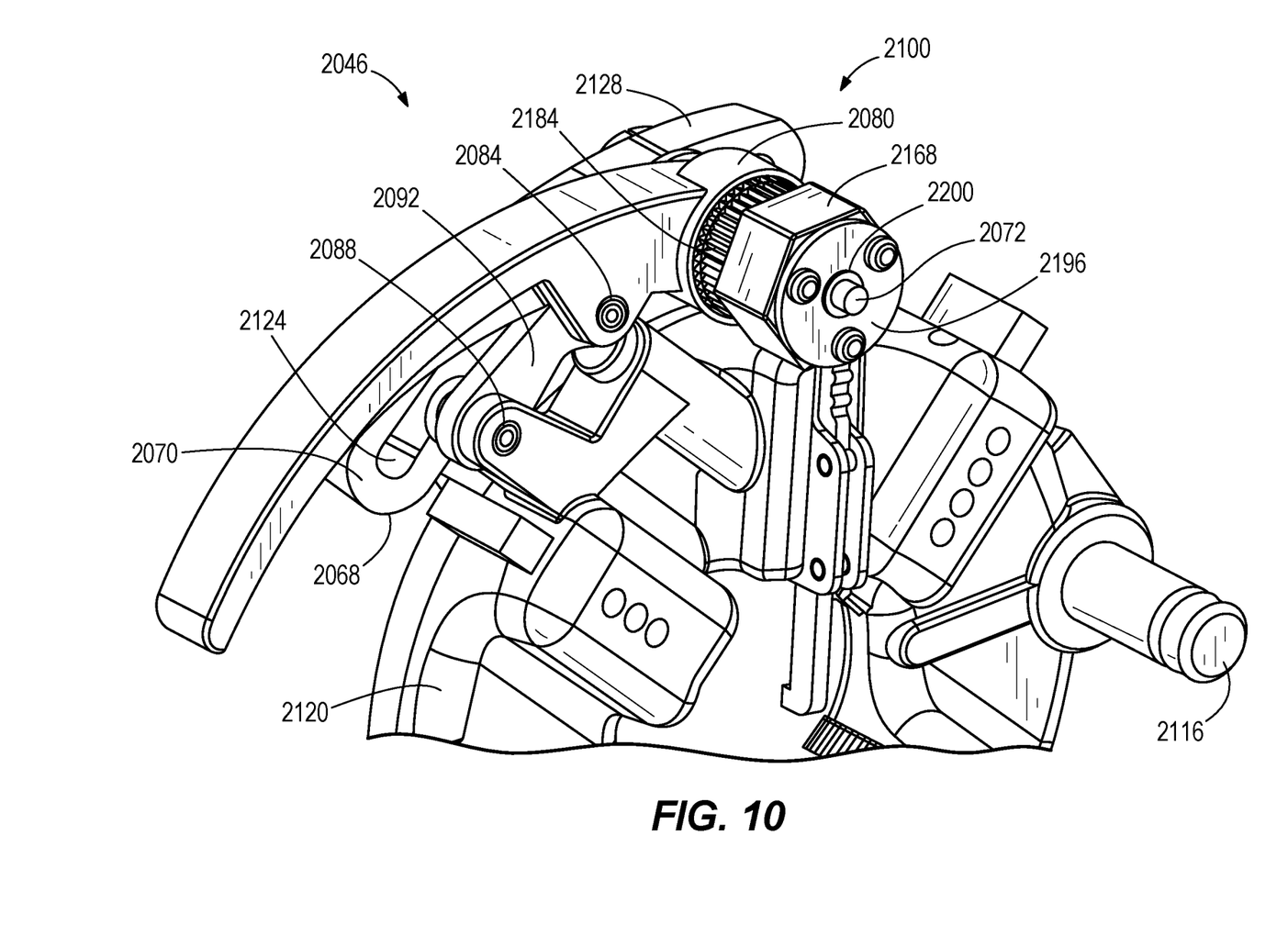
FIG. 10 is an enlarged, perspective view of a thread-cutting die head in accordance with another embodiment of the invention for use with the powered pipe threader of FIG. 1.
Figure 11:
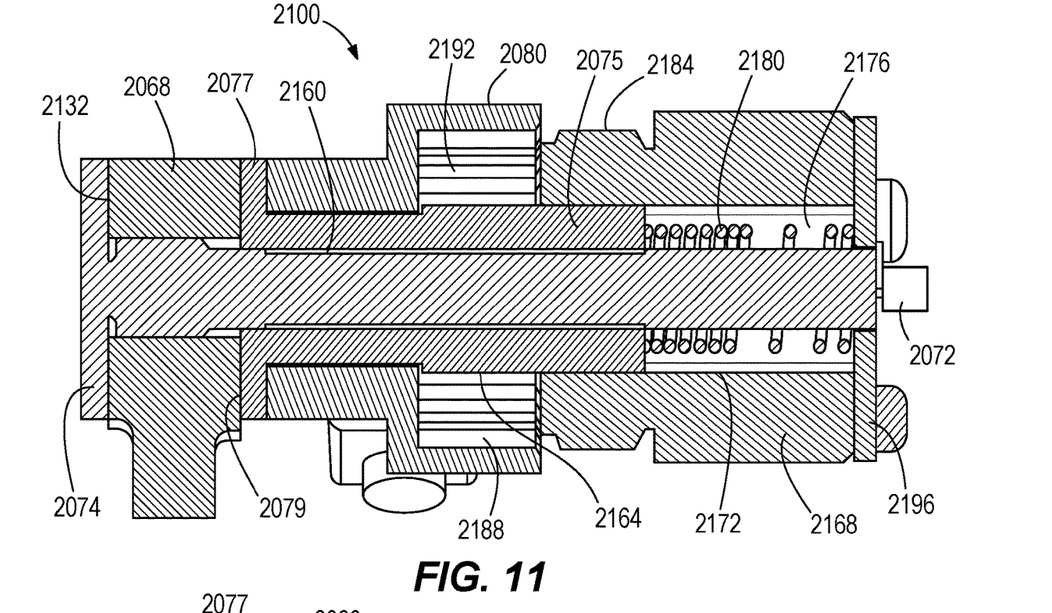
FIG. 11 is a side, cross-sectional view of a die locking system of the die head of FIG. 10.
Figure 12:
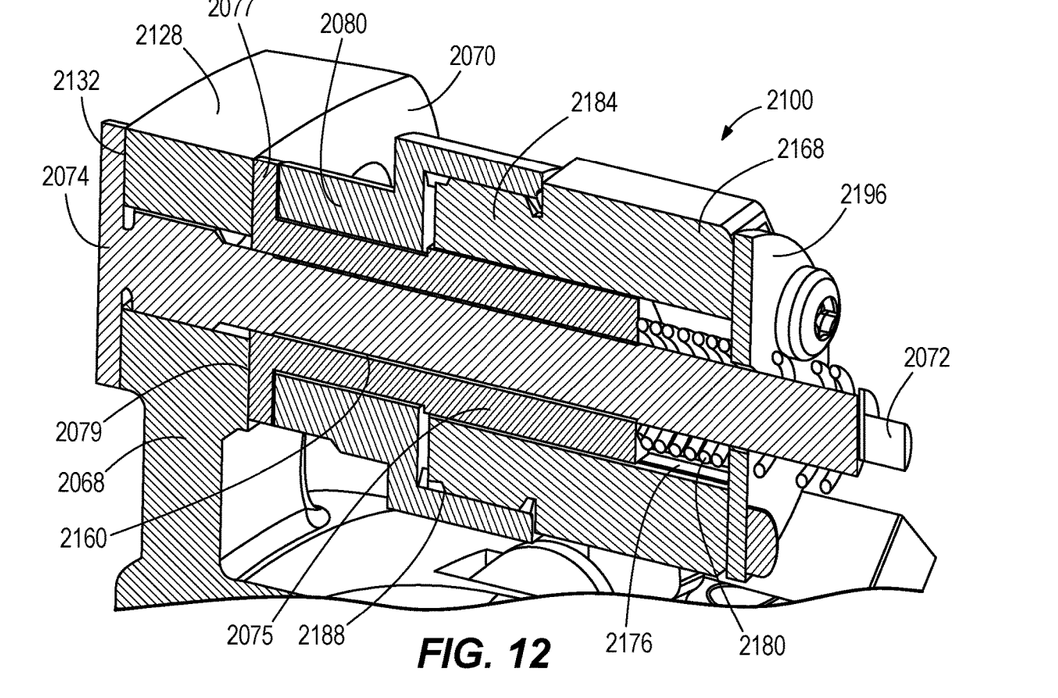
FIG. 12 is an enlarged, perspective cross-sectional view of the die locking system of FIG. 11.

FIGS. 10-12 illustrate another embodiment of a die head 2046 including a locking system 2100. Like components and features of the die head 46 of FIGS. 2-8B will be used plus "2000". The locking system 2100 includes a positioning screw 2072 extending through the die-locking arm 2080 and into the arcuate slot 2124 of the cam plate 2068. The positioning screw 2072 includes a head 2074 contacting a rear face 2132 of the cam plate 2068 (FIG. 10) and a threaded portion 2160. The locking system 2100 also includes a bushing 2075 surrounding the positioning screw 2072 having a cylindrical portion about which the die-locking arm 2080 is pivotably mounted and a flange portion 2077 positioned between the cam plate 2068 and the die-locking arm 2080. The flange portion 2077 includes an annular surface 2079 facing a front face 2070 of the cam plate 2068.

With reference to FIG. 11, the bushing 2075 is threaded to the threaded portion 2160 of the positioning screw 2072 and includes an outer splined portion 2164. The locking system 2100 also includes a coupler 2168 having an inner splined portion 2172 configured to mate with and be supported on the outer splined portion 2164 of the bushing 2075. As such, the coupler 2168 is coupled for co-rotation with the bushing 2075. The coupler 2168 further includes an inner chamber 2176 housing a compression spring 2180 surrounding the positioning screw 2072 that biases the coupler 2168 in a direction away from the die-locking arm 2080, and an outer splined portion 2184 configured to be received within an aperture 2188 in the die-locking arm 2080 and mate with a corresponding inner splined portion 2192 of the die-locking arm 2080 when the coupler 2168 is received within the aperture 2188. As shown in FIG. 11, one end of the compression spring 2180 is seated against the distal end of the bushing 2075 and an opposite end of the compression spring 2180 is seated against an end plate 2196, which is fastened to the coupler 2168. With reference to FIG. 10, a retaining ring 2200, against which the end plate 2196 is abutted, is affixed to the positioning screw 2072, thereby limiting an extent to which the compression spring 2180 can rebound and bias the coupler 2168 away from the die-locking arm 2080. In other embodiments of the locking system 2100, the retaining ring 2200 can be substituted with other common retaining features that are functionally equivalent to the retaining ring 2200, such as a screw pin, a pressed component, etc.

As shown in FIGS. 11 and 12, the coupler 2168 is movable from a disengaged position, in which the splined portion 2184 of the coupler 2168 is removed from the aperture 2188 (shown in FIG. 11), thus permitting the die-locking arm 2080 to rotate relative to the bushing 2075 without transferring torque thereto, and an engaged position, in which the splined portion 2184 of the coupler 2168 is received in the aperture 2188 and mated with the inner splined portion 2192 of the die-locking arm 2080 (shown in FIG. 12), thus rotationally interlocking the die-locking arm 2080 and the coupler 2168.

With reference to FIGS. 11 and 12, to secure the locking system 2100 to the cam plate 2068, the user presses the coupler 2168 into the aperture 2188 of the die-locking arm 2080 (FIG. 10) along the splined outer portion 2164 of the bushing 2075 and against the bias of the spring 2180, thereby mating the outer splined portion 2184 of the coupler 2168 with the inner splined portion 2192 of the die-locking arm 2080, thereby rotationally interlocking the coupler 2168 to the die-locking arm 2080. This action is sufficient to overcome the biasing force of the spring 2180, and the coupler 2168 is maintained on the die-locking arm 2080 by the frictional forces between the splined portions 2184, 2192. Thereafter, the user rotates the die-locking arm 2080 in a tightening direction (e.g., clockwise or counterclockwise, depending on the thread configuration between the bushing 2075 and the positioning screw 2072), thereby rotating the coupler 2168 using the relatively large torque generated by pivoting the die-locking arm 2080 and the bushing 2075 in order to tighten the bushing 2075 against the front face 2070 of the cam plate 2068. While the bushing 2075 is being tightened against the cam plate 2068, the head 2074 of the positioning screw 2072 is simultaneously clamped onto the rear face 2132 of the cam plate 2068, thus, imparting a clamping force on the cam plate 2068 to secure the locking system 2100 to the cam plate 2068. Because the die-locking arm 2080 is relatively long, the user can exert a sufficiently high amount of torque on the bushing 2075 to apply the clamping force to the cam plate 2068 without using a cheater bar or other tool to increase the user's leverage. Therefore, unintentional loosening of the locking system 2100 when the die head 2046 is forming threads on the pipe 14 is prevented.

Once the tightening operation is complete, the user can release the coupler 2168, which is returned to the disengaged position shown in FIG. 11 by the rebounding compression spring 2180, thereby permitting the die-locking arm 2080 to be pivoted relative to the bushing 2075 between the latched and released positions described above. If the user wishes to tighten the locking system 2100 multiple times, the user simply repeats the tightening operation described above, cycling between engaging/disengaging the coupler 2168 with the locking-arm 2080, until the user achieves a desired clamping force between the cam plate 2068 and the positioning screw 2072 to secure the locking system 2100 to the cam plate 2068. Likewise, to release the locking system 2100, the coupler may again be moved to the engaged position shown in FIG. 10 and the die-locking arm 2080 pivoted in a loosening direction to rotate the bushing 2075 in an opposite, loosening direction to release the clamping force on the cam plate 2068.

The locking systems 100, 1100, 2100 are configured to apply a clamping force onto the cam plate 68 to lock it in position with respect to the die carrier 120. After a threading operation has been completed, and the user wishes to thread another pipe 14 of the same nominal outer diameter, (with the any of the locking systems 100, 1100, 2100 in their locked states) the user can pivot the die-locking arm 80 from the latched position to the released position by pivoting the die-locking arm 80 about the bushings of the respective locking systems 100, 1100, 2100. Because the die-locking arm 80 is also pivotably coupled with the die carrier 120 (via the pins 88, 84 and link 92), pivoting movement of the die-locking arm 80 toward the released position (i.e., clockwise from the frame of reference of FIG. 2) also displaces the locking system 100, 1100, 2100 along an arcuate path centered on axis A. And, because the locking system 100, 1100, 2100 is affixed or locked to the cam plate 68, such movement of the locking system 100, 1100, 2100 imparts a moment to the cam plate 68, causing it to rotate relative to the die carrier 120 and retract the cutting dies 112 away from the threaded pipe 14. The threaded pipe 14 can then be replaced with a new, unthreaded pipe having the same nominal outer diameter for a subsequent threading operation. The die-locking arm 80 is then pivoted in an opposite direction toward its latched position, rotating the cam plate 68 in an opposite direction and displacing the cutting dies 112 radially inward toward the pipe 14. After the die-locking arm 80 has returned to its latched position, the cutting dies 112 are also returned to their predetermined position based on the position where the locking system 100, 1100, 2100 is locked to the depth scale 128 of the cam plate 68.

By securing the locking system 100, 1100, 2100 to the cam plate 68 while the die-locking arm 80 is pivoted to its released position, the quick exchange of pipes 14 is allowed so the user doesn't have to reposition the locking system 100, 1100, 2100 to the desired depth on the depth scale 128 after each use. Therefore, the user is able to thread pipes 14 having the same nominal outer diameter more efficiently.

Although the invention has been described in detail with reference to certain preferred embodiments, variations and modifications exist within the scope and spirit of one or more independent aspects of the invention as described.

Various features of the invention are set forth in the following claims.

What is claimed is:

1. A thread-cutting die head for a powered pipe threading machine, the thread-cutting die head comprising:
   a die carrier, defining a central axis, for supporting a plurality of thread-cutting dies for displacement relative to the central axis in a radially inward direction and radially outward direction;
   a cam plate coaxial with the die carrier including a plurality of cam members for engaging with the plurality of thread-cutting dies and displacing the cutting dies in the radially inward direction and radially outward direction in response to relative rotation between the cam plate and the die carrier; and
   a locking system including
      a positioning screw extending through an arcuate slot in the cam plate,
      a cam washer surrounding the positioning screw,
      a pin threaded to the positioning screw, and
      a cam handle including
         a cylindrical cam portion engaged with the cam washer and defining a rotational axis of the handle, and
         an aperture in which the pin is slidably received, the aperture defining a longitudinal axis that is offset from the rotational axis of the handle,
      wherein rotation of the cam handle in a first direction about the rotational axis is configured to impart a clamping force against the cam washer to lock the rotational position of the cam plate relative to the die carrier.

2. The thread-cutting die head of claim 1, wherein the cam handle is rotatable in an opposite, second direction about the rotational axis to release the clamping force, thereby permitting relative rotation between the cam plate and the die carrier.

3. The thread-cutting die head of claim 1, wherein the locking system further includes a die-locking arm pivotably mounted to the die carrier and operable to lock a rotational position of the cam plate relative to the die carrier.

4. The thread-cutting die head of claim 3, wherein the positioning screw extends through the die-locking arm.

5. The thread-cutting die head of claim 3, wherein the locking system further includes a rubber isolator surrounding the positioning screw and positioned between the die-locking arm and the cam washer.

6. The thread-cutting die head of claim 3, wherein the locking system further includes a bushing surrounding the positioning screw and partially received within the die-locking arm.

7. The thread-cutting die head of claim 6, wherein a front face or a rear face of the cam plate is a knurled surface.

* * * * *